United States Patent [19]

Elders

[11] E Re. 30,807

[45] Reissued Dec. 1, 1981

[54] POINT-ATTACK BIT

[76] Inventor: Gerald W. Elders, 38 Yakashba Estates, Prescott, Ariz. 86301

[21] Appl. No.: 104,099

[22] Filed: Dec. 17, 1979

Related U.S. Patent Documents

Reissue of:

[64] Patent No.: 4,065,185
Issued: Dec. 27, 1977
Appl. No.: 707,647
Filed: Jul. 22, 1976

[51] Int. Cl.[3] ..... E21C 35/18

[52] U.S. Cl. ..... 299/86; 175/354

[58] Field of Search ..... 299/86–93; 175/354, 377

[56] References Cited

U.S. PATENT DOCUMENTS

| | | | |
|---|---|---|---|
| 757,124 | 4/1904 | Kampfe | 175/415 X |
| 1,550,669 | 8/1925 | Bowman | 299/86 X |
| 2,176,358 | 10/1939 | Pearce | 175/354 |
| 2,528,300 | 10/1950 | Degner | 175/377 |
| 3,361,481 | 1/1968 | Maddock | 299/86 |
| 3,476,438 | 11/1969 | Bower | 299/86 |
| 3,652,130 | 3/1972 | Elders | 299/86 |
| 3,801,158 | 4/1974 | Radd et al. | 299/86 |
| 3,833,264 | 9/1974 | Elders | 299/86 |

*Primary Examiner*—Ernest R. Purser
*Attorney, Agent, or Firm*—Cohn, Powell & Hind

[57] ABSTRACT

A point-attack bit retained for rotation in a block bore, and used for removing material from a mine face. The bit has an elongate shank, and a head integral and coaxial with the shank, the head including a plurality of peripherally spaced, laterally projecting vanes extending generally longitudinally of the bit. Each vane is substantially triangular with a narrow leading end and a wider trailing end, and has sides that extend from the leading end to the trailing end. One of the vane sides has a different angle with respect to the longitudinal axis of the bit than the other vane side to provide different transverse forces on the vane sides upon contact with material being mined to effect a positive turning of the bit upon picking of the mine face. More particularly, the vane sides extend from the leading end to the trailing end on opposite sides of a longitudinal plane passed through the longitudinal axis of the bit and the leading end of the vane so that one vane side has a different included angle with respect to the longitudinal plane than the other vane side.

11 Claims, 4 Drawing Figures

POINT-ATTACK BIT

Matter enclosed in heavy brackets [ ] appears in the original patent but forms no part of this reissue specification; matter printed in italics indicates the additions made by reissue.

BACKGROUND OF THE INVENTION

This invention relates generally to improvements in a point-attack bit, and more particularly to an improved bit of this type that turns in its mounting to provide a self-sharpening action resulting in a longer bit wear and life.

A self-sharpening bit of this general type is disclosed in applicant's prior U.S. Pat. No. 3,652,130 and U.S. Pat. No. 3,833,264.

SUMMARY OF THE INVENTION

The present self-sharpening bit provides an improved construction that realizes a more effective and positive turning of the bit during picking action.

The bit will turn automatically as the bit picks a wall so that wear is distributed substantially evenly over the periphery of the bit head, thereby creating a self-sharpening action.

The point-attack bit includes a head integral and coaxial with an elongate shank, the head including a plurality of peripherally spaced, laterally projecting vanes extending generally longitudinally of the bit. Each vane is substantially tringular with a narrow leading end and a wider trailing end. The sides of each substantially triangular vane extend from the leading end to the trailing end. One vane side has a different angle with respect to the longitudinal axis of the bit than the other vane side to provide different transverse forces on the vane sides of each vane upon contact with material being mined to effect a positive turning of the bit upon picking of the mine face.

More particularly, to achieve the advantageous results, the vane sides of each substantially triangular vane extend from the leading end to the trailing end on opposite sides of a longitudinal plane passed through the longitudinal axis of the bit and the leading end of the vane. One vane side has a different included angle with respect to the longitudinal plane than the other vane side.

To further assure different transverse forces on the vane sides upon contact with material being mined and thereby effect a more positive turning of the bit, the height radially of the bit of the vane sides of each vane is different at the leading end of the vane than at the trailing end. In the embodiment shown, the height radially of the bit of the vane sides of each vane increases from the leading end to the trailing end. In addition, contributing to this advantageous result, the height radially of the bit of one of the vane sides of each vane is different than the other vane side.

Contributing to the more effective rotation of the bit, it will be understood that the vanes are peripherally spaced so that only one vane is disposed on each of the longitudinal planes passed through the longitudinal axis of the bit and the leading end of each vane. In other words, this longitudinal plane of each vane passes between a pair of peripherally spaced vanes. This arrangement precludes any balanced or stabilized condition upon the picking action of the bit on the material face.

As the material being mined flows rearwardly of the bit head between peripherally adjacent vanes, such material will turn the bit in one direction or the other. In one embodiment, this flow of material between peripherally spaced vanes will provide an additional rotational impetuous or kick as the material leaves the trailing end of the vanes. This additional turning impetuous is provided by a portion of each vane side adjacent to the trailing end that has a greater included angle than the side portion adjacent the leading end.

DESCRIPTION OF THE PREFERRED EMBODIMENTS

Figure 1:
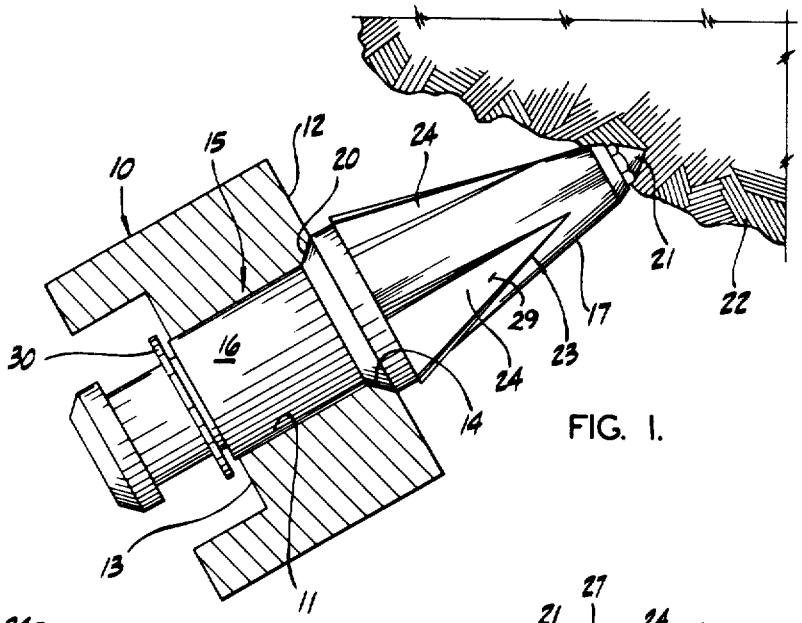
FIG. 1 is a side elevational view, partially in cross-section, of a bit and block assembly, illustrating the picking action of the bit.
Figure 2:
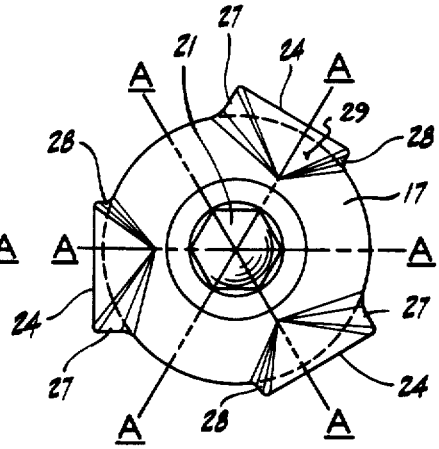
FIG. 2 is a front elevational view of the bit head shown in FIG. 1.
Figure 3:
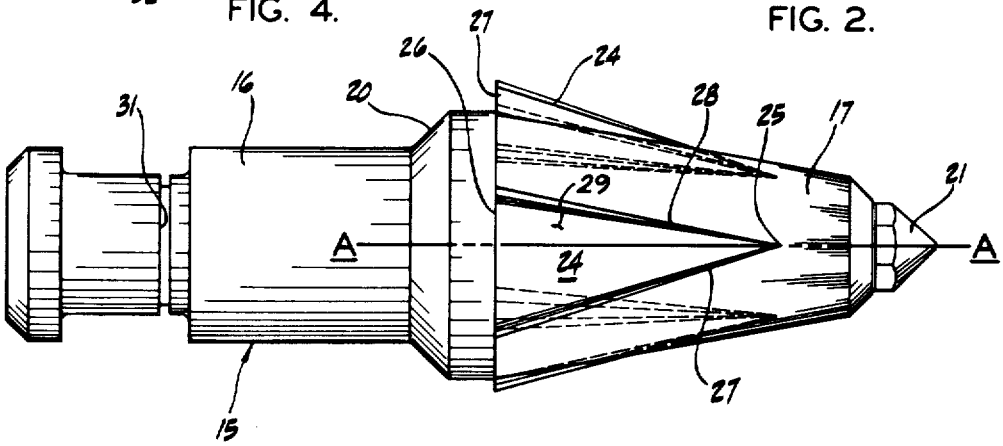
FIG. 3 is a side elevational view of the bit.

Referring now by characters of reference to the drawing, and first to the embodiments of FIGS. 1–3, it will be understood that the block 10 is provided with a substantially cylindrical bore 11 extending through the front block face 12 and the rear block face 13. The bore 11 is slightly flared at the front block face 12 to provide an outwardly divergent shoulder 14.

The point-attack bit, generally indicated at 15 includes an elongate shank 16 having a circular cross section. The bit shank 16 is rotatively mounted within the cylindrical block bore 11. A tapered bit head 17 is formed integrally and coaxially with the shank 16, the head 17 tapering toward the front end of the bit. The bit shank 16 includes an enlarged, outwardly diverging shank portion 20 integrally connected to the tapered head 17, the shank portion 20 engaging the annular bore shoulder 14.

Inserted in and attached to the smaller end of the tapered bit head 17 is a carbide cutting tip 21. The tip 21 is provided with a relatively sharp point. As is illustrated in FIG. 1, the tapered bit head 17, including the carbide tip 21, picks at the wall 22 in order to cut away a portion of such wall 22. The tapered bit head 17 enters the wall 22 with its smaller end foremost and with its longitudinal axis arranged at a slight angle to the surface of the wall in an intermittent picking action.

It will be understood that this bit and block assembly is utilized in a cutting machine that operates to move the bit head 17 point first into the wall 22 in the picking action previously described, and operates to move the bit head 17 continuously into, through, and out of the wall 22 in a curved path for a complete picking action.

In the embodiment of FIG. 1, the tapered head 17 has a substantially conical configuration. The head 17 includes a turning means generally referred to by 23. The turning means 23 is a plurality of peripherally spaced, laterally projecting vanes 24 extending generally longitudinally of the bit. Each vane 24 is substantially triangular in shape with a narrow leading end 25 and a wider trailing end 26. Each triangularly-shaped vane 24 includes sides 27 and 28 that extend from the leading end 25 to the trailing end 26 on opposite sides of a longitudinal plane A—A passed through the longitudinal axis of the bit and the leading end 25 of the vane 24. *A top surface 29 extends between the sides 27 and 28.*

It will be understood that one vane side 27 has a different angle with respect to the longitudinal axis of the bit than the other vane side 28. More particularly, it will be understood that one vane side 27 has a different included angle with respect to the longitudinal plane A—A than the other vane side 28 in order to provide different transverse forces on the vane sides 27 and 28 upon contact with the material being mined as such material flows rearwardly along the bit head 17 between the vanes 24, to effect a positive turning of the bit upon picking of the mine face.

To assure the creation of different transverse forces on the vane sides 27 and 28 upon contact with the material being mined, the height radially of the bit of the vane sides 27 and 28 of each vane 24 is different at the leading end 25 than at the trailing end 26. Preferably, this height of the vane sides 27 and 28 increases from the leading end 25 to the trailing end 26. In addition, the height of one side 27 is different than the other vane side 28 of each vane 24. In the embodiment illustrated, the height of the vane side 27 is greater than the height of the vane side 28.

Also contributing to the realization of a positive turning of the bit by precluding any balanced or stabilized conditions on the vanes 24 during the picking action, the vanes 24 are peripherally spaced so that only one vane is disposed on each longitudinal plane A—A as is best illustrated in FIG. 2. In other words, the longitudinal plane A—A of each vane 24 passes diametrically through a void between a pair of peripherally spaced vanes 24.

It will be understood that the bit 15 could be mounted and locked into the block 10 by a locking mechanism similar to that of U.S. Pat. No. 3,833,264 if desired. However, in the embodiment shown, a spring clip 30 is detachably mounted in a compatible groove 31 formed in the bit shank 16, the clip 30 selectively engaging the rear block face 13 to hold the bit 15 in place, and yet permitting rotation of the bit in the block 10.

To install the bit 15, the shank 16 is inserted into the block bore 11. The locking clip 30 is then located in the shank groove 31 rearwardly of the rear block face 13. The bit 15 is now secured to the block 10, and yet can rotate freely in the block bore 11.

During the picking action of the bit 15, the cutting tip 21 will engage the wall 22. As the bit head 17 moves continuously into, through, and out of the wall 22 in a curved path, the material being mined will flow rearwardly of the bit head 17 between the vanes 24. Upon frictional contact of this material with the sides 27–28 of the vanes 24, the transverse forces on the vane sides 27–28 will cause positive rotation of the bit 15 in the block bore 11, thereby causing the head 17 to be self-sharpened.

Figure 4:
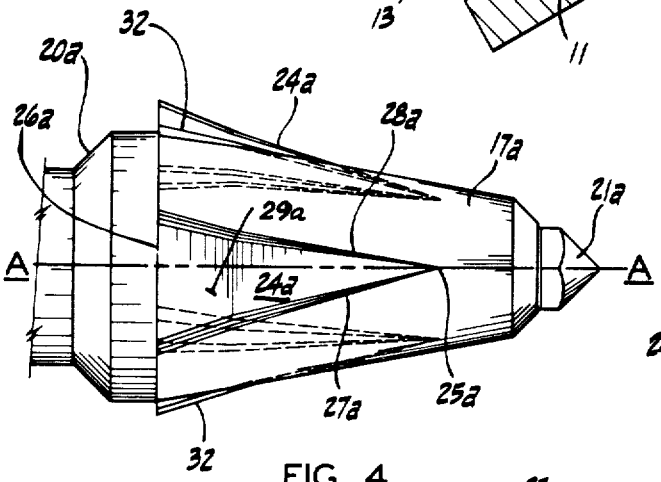
FIG. 4 is a fragmentary, side elevational view of a modified bit head.

FIG. 4 discloses a modified construction of the turning means 23. The bit has essentially the same structure as the embodiment of FIGS. 1–3, and accordingly, the same reference numbers will be used where possible but using the suffix A to distinguish. *A top surface 29A extends between the sides 27A and 28A.* The basic difference in the construction of the vanes 24A resides in the fact that each vane side 27A–28A has a portion 32 adjacent to the trailing end 26A that has a greater included angle than the portion adjacent the leading end 25A. Consequently, as the material being mined moves rearwardly along the bit head 17A between the vanes 24A, such material will engage the vane side portions 32 just before such material is discharged rearwardly from the head 17A. Upon engagement of the material with the vane side portions 32, there is a change in the transverse forces tending to rotate the bit head 17. Because of the greater included angle of the vane side portions 32, there is an impetuous or "kick" provided transversely to the bit head 17A that tends to turn the bit head 17A.

I claim as my invention:

1. A point-attack bit for removing material from a mine face, comprising:

a. an elongate shank, and b. a head integral and coaxial with the shank, the head including a plurality of peripherally spaced, laterally projecting vanes extending generally longitudinally of the bit, each vane being substantially triangular with a narrow leading end and a wider trailing end, and having relatively diverging sides that extend from the leading end to the trailing end, and contact with material being mined to effect a positive turning of the bit upon picking of the mine face.

2. A point-attack bit as defined in claim 1, in which:

c. one vane side of each vane has a different angle with respect to the longitudinal axis of the bit than the other vane side to provide different transverse forces on the vane sides upon contact with material being mined to effect a positive turning of the bit upon picking of the mine face.

3. A point-attack bit as defined in claim 1, in which:

c. the vane sides of each vane extend from the leading end to the trailing end on opposite sides of a longitudinal plane passed through the longitudinal axis of the bit and the leading end of the vane, one vane side of each vane having a different included angle with respect to the longitudinal plane than the other vane side to provide different transverse forces on the vane sides on contact with material being mined to effect a positive turning of the bit upon picking of the mine face.

4. A point-attack bit as defined in claim 3, in which:

d. in a transverse plane passed through the bit head, the height radially of the bit of one of the vane sides of each vane is different than the height radially of the bit of the other vane side.

5. A point-attack bit as defined in claim 3, in which:

d. the vanes are peripherally spaced so that only one vane is disposed on each said longitudinal plane passed through the longitudinal axis of the bit and the leading end of each vane.

6. A point-attack bit as defined in claim 3, in which:

d. the said longitudinal plane of each vane passes diametrically of the bit between a pair of peripherally spaced vanes without passing through another vane.

7. A point-attack bit as defined in claim 3, in which:

(d) each vane side of each vane has a side portion adjacent the trailing end that has a greater included angle than the side portion adjacent the leading end.

*8. A point-attack bit for removing material from a mine face, comprising:*

*(a) an elongate shank, and*

*(b) a head integral and coaxial with the shank, the head including a plurality of peripherally spaced, laterally projecting vanes extending generally longitudinally of the bit, each vane having a leading end and a trailing end, the trailing end being wider than the leading end, and having relatively diverging sides that extend from the leading end to the trailing end, and contact with*

*the material being mined to effect a positive turning of the bit upon picking of the mine face, and having a top surface between the sides, the top surface being wider at the trailing end than at the leading end.*

*9. A point-attack bit for removing material from a mine face, comprising:*

*(a) an elongate shank,*

*(b) a head integral and coaxial with the shank, the head including projecting vanes extending generally longitudinally of the bit, each vane having a leading end and a trailing end and having relatively diverging sides that extend from the leading end to the trailing end, and contact with material being mined to effect a positive turning of the bit upon picking of the mine face, and*

*(c) one vane side of each vane has a different angle with respect to the longitudinal axis of the bit than the other vane side.*

*10. A point-attack bit for removing material from a mine face, comprising:*

*(a) an elongate shank,*

*(b) a head integral and coaxial with the shank, the head including a plurality of peripherally spaced laterally projecting vanes extending generally longitudinal of the bit, each vane having a leading and a trailing end and having relatively diverging sides that extend from the leading end to the trailing end on opposite sides of a longitudinal plane passed through the longitudinal axis of the bit and the leading end of the vane, and contact with material being mined to effect a positive turning of the bit upon picking of the mine face, and*

*(c) the vanes are peripherally spaced so that only one vane is disposed on a longitudinal plane passed through the longitudinal axis of the bit and the leading end of each vane.*

*11. A point-attack bit for removing material from a mine face, comprising:*

*(a) an elongate shank,*

*(b) a head integral and coaxial with the shank, the head including projecting vanes extending generally longitudinally of the bit, each vane having a leading end and a trailing end and having relatively diverging sides that extend from the leading end to the trailing end, and contact with material being mined to effect a positive turning of the bit upon picking of the mine face, and*

*(c) said sides having different included angles with respect to a plane passed through said leading end and the longitudinal axis of the bit.*

* * * * *